UNITED STATES PATENT OFFICE.

PAUL H. GRIMM, OF GLEN COVE, NEW YORK, ASSIGNOR TO THE GLEN COVE MANUFACTURING COMPANY, OF SAME PLACE.

OBTAINING CATTLE-FOOD FROM STARCH REFUSE.

SPECIFICATION forming part of Letters Patent No. 406,166, dated July 2, 1889.

Application filed April 12, 1889. Serial No. 307,026. (No specimens.)

*To all whom it may concern:*

Be it known that I, PAUL H. GRIMM, of Glen Cove, in the county of Queens and State of New York, have invented a new and useful Improvement in the Art of Treating the Refuse from the Manufacture of Starch and Glucose, of which the following is a full, clear, and exact description.

This invention consists in the process, hereinafter described and claimed, whereby I make from the refuse of the manufacture of starch and glucose a dry feed for animals containing all the nutritive elements remaining in the refuse after the extraction of the starch or glucose.

The refuse resulting from the manufacture of starch and glucose is of two kinds—namely, what is known as the "coarse refuse," consisting, mainly, of the husks and germs of the kernels of the grain, and what is known as the "fine refuse," "spent liquor," or "gluten water," containing the glutinous and nitrogenous part of the grain. According to my invention these two kinds of refuse are treated in the following manner: The coarse refuse, which comes directly from the separators, is conveyed to any suitable machine, which separates the liquid from the solid portions and leaves it in a comparatively dry condition, in which it will readily absorb water. This machine may be such as is the subject of my Letters Patent No. 296,000, dated April 1, 1884; but any machine capable of expressing liquids from solids may be used. The fine refuse may be obtained by the method described in my Letters Patent No. 303,930, dated August 19, 1884.

The coarse refuse having been freed, as above described, from the greater portion of its moisture, has added to it and mixed with it in any suitable vessel or receptacle the gluten water or fine refuse in as nearly as practicable the same proportions in which the latter was contained in the grain before grinding. The two grades of refuse having now been thoroughly mixed, the mass is or may be transferred to storage-bins, in which it is leached, and thence to a machine of suitable construction—such, for instance, as an ordinary press—wherein it is subjected to pressure, whereby the greater portion of the water contained in it is separated from the solid portion, and a comparatively dry mixed mass, consisting of all the coarse refuse and of all the nutritive portion of the fine refuse, is obtained. This partly-dried mixture is afterward subjected to heat, in order to extract the remaining moisture, which could not be removed by pressure, and the resulting product is a dry feed possessing superior nutritive qualities for the feeding of animals, and in a very convenient form for market.

That part of the process hereinabove described which consists in leaching the mixture of the two kinds of refuse in storage-bins may be omitted when the process is performed in places where space is limited.

What I claim as my invention, and desire to secure by Letters Patent, is—

The process herein described of obtaining dry feed for animals from the refuse of the starch and glucose manufactures, consisting in first subjecting the coarse refuse to pressure to free it from water, next adding to this coarse refuse freed from water the fine refuse containing the glutinous and nitrogenous parts of the grain, afterward subjecting the said coarse refuse and fine refuse together to pressure to express the greater part of the moisture therefrom, and finally subjecting them to the action of heat for the purpose of evaporating the moisture therefrom, substantially as herein set forth.

PAUL H. GRIMM.

Witnesses:
FREDK. HAYNES,
L. J. KELLOGG.